(12) United States Patent
Abledu

(10) Patent No.: US 10,439,481 B2
(45) Date of Patent: *Oct. 8, 2019

(54) ION SEPARATOR

(71) Applicant: Kodzo Obed Abledu, Pasadena, CA (US)

(72) Inventor: Kodzo Obed Abledu, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,808

(22) Filed: Jul. 22, 2018

(65) Prior Publication Data

US 2019/0022588 A1    Jan. 24, 2019

Related U.S. Application Data

(60) Provisional application No. 62/535,843, filed on Jul. 22, 2017, provisional application No. 62/535,842, (Continued)

(51) Int. Cl.
*H02K 44/16* (2006.01)
*C25B 1/02* (2006.01)
(Continued)

(52) U.S. Cl.
CPC ............. *H02K 44/16* (2013.01); *B01D 61/08* (2013.01); *B01D 61/10* (2013.01); *B01D 61/12* (2013.01); *B03C 1/034* (2013.01); *B03C 1/0332* (2013.01); *C02F 1/44* (2013.01); *C25B 1/02* (2013.01); *H02K 1/165* (2013.01); *H02K 1/17* (2013.01); *H02K 1/185* (2013.01); *H02K 1/22* (2013.01); *H02K 1/223* (2013.01); *H02K 1/265* (2013.01);
(Continued)

(58) Field of Classification Search
CPC ........ H02K 44/16; H02K 1/185; H02K 44/12; H02K 7/18; H02K 1/22; H02K 5/124; H02K 2201/03; H01M 8/0656; H01M 2300/0002; C25B 1/02; B03C 1/002; B03C 1/02; B03C 1/023; B03C 1/025; B03C 1/029; B03C 1/03; B03C 1/0332; B03C 1/033; B03C 1/0335; B03C 1/034; B03C 1/035; B03C 1/288; B03C 1/30; B03C 1/32; B03C 2201/00; B03C 2201/18; B03C 2201/22; C02F 1/48; C02F 1/484; C02F 1/485; C02F 1/487; C02F 1/481; C02F 1/483
See application file for complete search history.

(56) References Cited

U.S. PATENT DOCUMENTS 1,414,170 A * 4/1922 Bethke ............. B03C 1/23
                                              209/223.2
3,324,026 A * 6/1967 Waterman .......... B01D 35/06
                                              204/665
(Continued)

*Primary Examiner* — David C Mellon
(74) *Attorney, Agent, or Firm* — John K. Park; Park Law Firm

(57) ABSTRACT

An ion separator for a water pump is provided, comprising a stator cylinder with input and output ports, homopolar north poles, and homopolar south poles, a drive shaft, a rotor core, and seals. Salt water pumped through the ion separator water pumps is desalinated by alternatively flushing out the positive and negative ions at various points as the water flows through the proposed devices. Two pump configurations are presented for use in desalination of salt water.

19 Claims, 17 Drawing Sheets

Related U.S. Application Data filed on Jul. 22, 2017, provisional application No. 62/535,840, filed on Jul. 22, 2017, provisional application No. 62/535,844, filed on Jul. 22, 2017.

(51) Int. Cl.

| | | |
|---|---|---|
| *H02K 1/22* | (2006.01) | |
| *H02K 5/124* | (2006.01) | |
| *H02K 7/18* | (2006.01) | |
| *H02K 44/12* | (2006.01) | |
| *H02K 1/18* | (2006.01) | |
| *B03C 1/033* | (2006.01) | |
| *B03C 1/034* | (2006.01) | |
| *B01D 61/08* | (2006.01) | |
| *B01D 61/10* | (2006.01) | |
| *B01D 61/12* | (2006.01) | |
| *C02F 1/44* | (2006.01) | |
| *H02K 1/16* | (2006.01) | |
| *H02K 1/17* | (2006.01) | |
| *H02K 1/26* | (2006.01) | |
| *H02K 1/27* | (2006.01) | |
| *H01M 8/0656* | (2016.01) | |

(52) U.S. Cl.
CPC .............. *H02K 1/278* (2013.01); *H02K 5/124* (2013.01); *H02K 7/18* (2013.01); *H02K 44/12* (2013.01); *B03C 2201/22* (2013.01); *H01M 8/0656* (2013.01); *H01M 2300/0002* (2013.01); *H02K 2201/03* (2013.01)

(56) References Cited

U.S. PATENT DOCUMENTS

| | | | |
|---|---|---|---|
| 3,451,918 A * | 6/1969 | Alexander | B01D 57/02 204/600 |
| 3,608,718 A * | 9/1971 | Aubrey, Jr. | B03C 1/035 209/214 |
| 3,887,457 A * | 6/1975 | Marston | B03C 1/0335 209/214 |
| 4,217,213 A * | 8/1980 | Schuster | B03C 1/033 210/223 |
| 4,395,746 A * | 7/1983 | Tanaka | B03C 1/24 134/1 |
| 5,932,096 A * | 8/1999 | Saho | B03C 1/027 209/223.1 |
| 6,346,196 B1 * | 2/2002 | Bose | B03C 1/01 209/214 |
| 2004/0114458 A1 * | 6/2004 | Berthier | B01F 13/0809 366/273 |
| 2004/0126273 A1 * | 7/2004 | Forney | A23L 3/28 422/22 |
| 2010/0044934 A1 * | 2/2010 | Taniguchi | B01F 13/0809 266/234 |
| 2015/0299004 A1 * | 10/2015 | Hofsajer | C02F 1/485 210/695 |

\* cited by examiner

ION SEPARATOR

RELATED APPLICATION

This application is a Non-provisional Application of Provisional Application Serial Nos. 62/535,843 for "Energy Storage, Hydrogen and Oxygen Production using Ion Separators" filed on 22 Jul. 2017, 62/535,842 for "Ion Separator Water Pump" filed on 22 Jul. 2017, 62/535,840 for "Use of Ion Separator in Chemistry" filed on 22 Jul. 2017, 62/535,844 for "Electromagnetic Ion Separator" filed on 22 Jul. 2017.

BACKGROUND OF THE INVENTION

The present invention relates to an ion separator, mainly for a water pump.

The need for an ion separator for a water pump has been present for a long time considering the expansive demands in the everyday life. This invention is directed to solve these problems and satisfy the long-felt need.

SUMMARY OF THE INVENTION

The present invention contrives to solve the disadvantages of the prior art.

An aspect of the invention provides an ion separator, mainly for a water pump, comprising a stator cylinder, a drive shaft, a rotor core, a pair of homopolar north poles, and a pair of homopolar south poles.

The drive shaft is disposed in the stator cylinder, extending from a right end portion of the stator cylinder to a left end portion of the stator cylinder, and configured to rotate with respect to the stator cylinder.

The rotor core is disposed around the drive shaft and comprises right (rotor core) laminations disposed on a right side portion of the rotor core, left (rotor core) laminations disposed on a left side portion of the rotor core, middle (rotor core) laminations disposed between the right and left rotor core laminations, right comparting (rotor core) laminations disposed between the right rotor core laminations and the middle rotor core laminations, and left comparting (rotor core) laminations disposed between the left rotor core laminations and the middle rotor core laminations, so that a cavity between the rotor core and stator cylinder is divided into a right outer compartment, a left outer compartment, and a middle compartment through two comparting seals installed between the stator cylinder and the right and left comparting rotor core laminations.

The pair of homopolar north poles are disposed close to a right end portion of the rotor core with a pair of air gaps over right rotor core laminations installed around the rotor core, and the pair of homopolar north poles are disposed so as to face each other on the upper side and the lower side of the rotor core through the stator cylinder.

The pair of homopolar south poles are disposed close to a left end portion of the rotor core with a pair of air gaps over left rotor core laminations installed around the rotor core, and the pair of homopolar south poles are disposed so as to face each other on the upper side and the lower side of the rotor core through the stator cylinder.

The ion separator for a water pump may further comprise a pair of rotor shaft seals installed between the drive shaft and right and left end surface portions of the stator cylinder for preventing leakage along the drive shaft.

Each of the right and left (rotor core) laminations may comprise a circular sheet metal with cut-out portions provided along outer edges of the circular sheet metal, and the circular sheet metal may have a diameter that is slightly smaller than an inner diameter of the stator cylinder.

The middle (rotor core) laminations may have a diameter smaller than the diameter of the right and left (rotor core) laminations, so as to form a recessed channel between the stator cylinder and the middle rotor core laminations.

Each of the right and left comparting (rotor core) laminations may comprise one or more first circular sheet metals having a diameter same as the diameter of the right and left (rotor core) laminations and one or more second circular sheet metals having a diameter slightly smaller than the diameter of the right and left (rotor core) laminations, and each of the circular sheet metals of the right and left comparting (rotor core) laminations may comprise a plurality of through-slots and the circular sheet metals are assembled so that the through-slots are aligned with one another.

The pair of homopolar north poles and the pair of homopolar south poles may comprise a pair of magnetic circuits, each of which comprising core members and field winding.

The pair of homopolar north poles and the pair of homopolar south poles may comprise a plurality of permanent magnets.

The ion separator for a water pump may further comprise an input port disposed and connected to one of the right and left outer compartments.

The ion separator for a water pump may further comprise three output ports, which are disposed and connected to the right and left outer compartments and the middle compartment.

The ion separator for a water pump may further comprise a drive motor and a mechanical water pump.

The drive motor is installed to a first end portion of the drive shaft and configured for rotating the drive shaft.

The mechanical pump is installed to a second end portion of the drive shaft and configured for pulling in salt water through a salt water through inlet provided through the mechanical water pump from outside and pushing it out into the input port through a through pipe.

The ion separator for a water pump may further comprise a frame for connecting the drive motor to the stator cylinder through a coupler provided through the frame.

Another aspect of the invention provides a water desalination system comprising a first ion separator and a second ion separator, a first drive motor, a second drive motor, a mechanical pump, and connecting pipes.

The first ion separator or the second ion separator is slightly different from the one in the previous embodiment.

These have two input ports located over their outer compartments and the previous embodiment had only one input port.

The first drive motor is installed to a first end portion of the drive shaft of the first ion separator and configured for rotating the drive shaft.

The second drive motor is installed to a first end portion of the drive shaft of the second ion separator and configured for rotating the drive shaft.

The mechanical water pump is installed to a second end portion of the drive shaft of the first ion separator and configured for pulling in salt water through a salt water through inlet provided through the mechanical pump from outside and pushing out into the input ports through a through tube.

The feeding pipe is connected and configured for feeding water containing negative ions (or positive ions, depending on the sense of rotation of the preceding ion separator) from a port of the first ion separator into two input ports of the second ion separator through a T-connector.

The motors are energized so as to rotate their corresponding ion separator such that one of them pulls in the negative ions and rejects the positive ions while the other ion separator pulls in positive ions and rejects the negative ions.

The positive ions in the salt water are rejected from entering the rotating rotor slots of the first ion separator and are flushed out through its nearby exit ports.

The second ion separator rejects entry of the negative ions into its rotating rotor slots and these ions are flushed out through its exit ports, and the water that enters the rotor slots comes out through exit port and pipe and contains no ions of the original dissolved salts and is thus desalinated.

The output ports of the first ion separator are aligned to face the output ports of the second ion separator, such that the acidic effluents of the second ion separator and the basic effluents of the first ion separator empty into the same space and quickly recombine and neutralize each other.

The water desalination system may further comprise a first drive motor, a first frame, a second drive motor, and a second frame.

The first drive motor is installed to a first end portion of the drive shaft of the first ion separator and configured for rotating the drive shaft.

The first frame is for connecting the drive motor to the stator cylinder through a first coupler provided through the first frame.

The second drive motor is installed to a first end portion of the drive shaft of the second ion separator and configured for rotating the drive shaft.

The second frame is for connecting the drive motor to the stator cylinder through a second coupler provided through the second frame.

The stator cylinder may comprise a plurality of magnet poles inserted into a plurality of slots fitting each pole face flush with the inner surface of the stator cylinder.

The stator cylinder may further comprise a pair of first interpoles and a pair of second interpoles.

The pair of first interpoles having south-pole inner faces are disposed in a pair of first dead zones between the first slots (that carry south poles).

The pair of second interpoles having north-pole inner faces are disposed in a pair of second dead zones between the second slots (that carry north poles).

The stator cylinder may further comprise a pair of first segmented magnets and a pair of second segmented magnets.

The pair of first segmented magnets have inner south pole faces and are affixed into a pair of first slots.

The pair of second segmented magnets have inner north pole faces and are affixed into a pair of second slots.

The stator cylinder may comprise three non-magnetic spacers and two cylindrical magnetic structures disposed among the three non-magnetic spacers.

The ion separator may further comprise two external magnetic cores configured to act as bridges between the two cylindrical magnetic structures, and complete the magnetic circuits between the two cylindrical magnetic structures, and also serve structural braces for the ion separators.

The advantages of the present invention are: (1) the ion separator for a water pump according to the invention provides a simple and efficient system for desalination; and (2) the ion separator for a water pump according to the invention can be realized by more than one configuration.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

The U.S. Provisional Patent Application No. 62/535,843 for "Energy Storage, Hydrogen and Oxygen Production using Ion Separators" filed on 22 Jul. 2017, 62/535,842 for "Ion Separator Water Pump" filed on 22 Jul. 2017, 62/535,840 for "Use of Ion Separator in Chemistry" filed on 22 Jul. 2017, 62/535,844 for "Electromagnetic Ion Separator" filed on 22 Jul. 2017 are incorporated by reference herein for any and all purposes.

Referring to the figures, the embodiments of the invention are described in detail.

Figure 1:
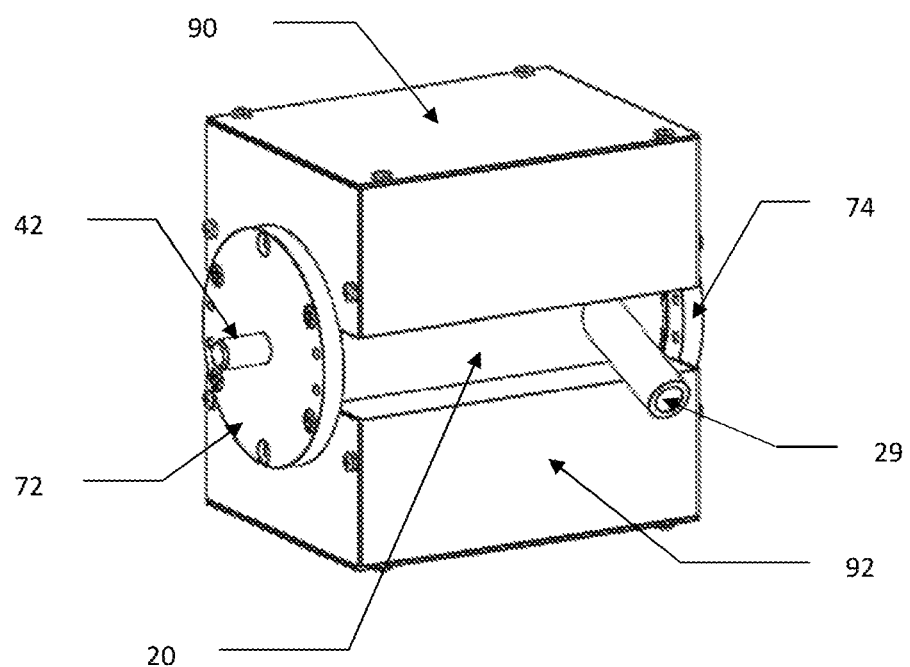
FIG. 1 is a perspective view of an ion separator viewed from an input side according to an embodiment of the invention.
Figure 2:
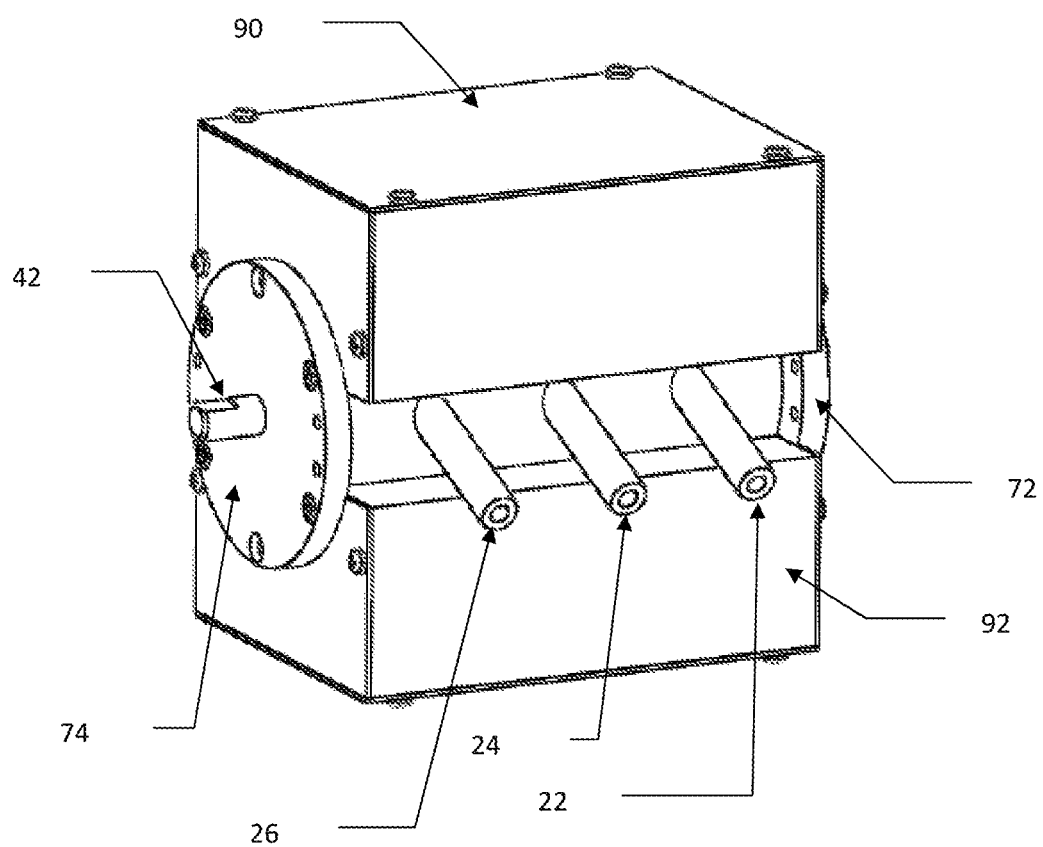
FIG. 2 is a perspective view of an ion separator viewed from an output side according to an embodiment of the invention.

An assembled ion separator to be used in making a water pump is shown in FIG. 1 and FIG. 2. It has a drive shaft (42) and an inlet port (29) protruding from the stator cylinder (20). The output side shows three output ports (22, 24, and 26).

Figure 3:
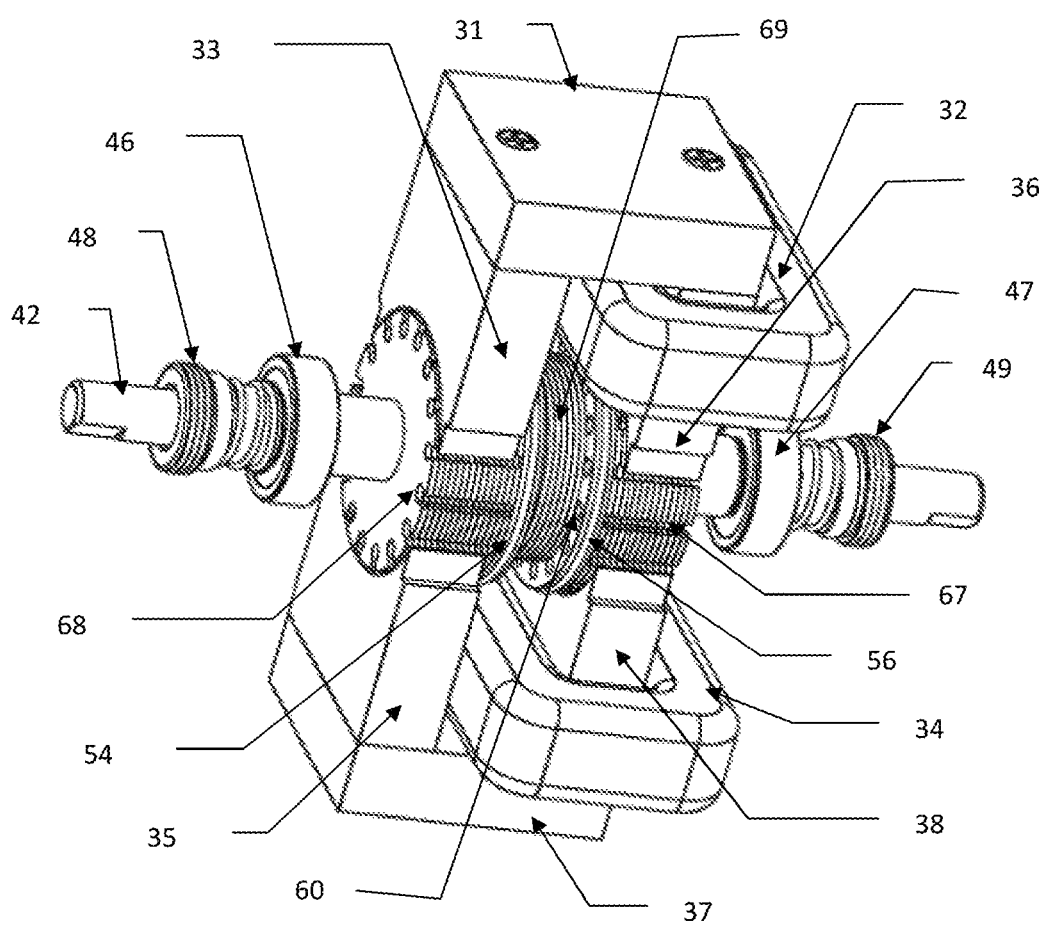
FIG. 3 is a perspective view of an ion separator rotor and magnetic circuits with external excitation coils according to an embodiment of the invention.

FIG. 3 shows the version of rotor and magnetic circuits of the ion separator used for water desalinating pumps. There are two magnetic circuits. The first comprises core members (33, 31, 36), rotor core laminations and two air gaps. This magnetic circuit is excited by field winding (32) such that at the air gap, core (36) is north pole and core (33) is south pole. The second magnetic circuit comprises core members (35, 37, 38), rotor core laminations and two air gaps. Field winding (34) excites this second magnetic circuit such that core (38) is north pole at the air gap and core (35) is south pole at the air gap. These two magnetic field distributions form one homopolar north pole on the right portion of the ion separator rotor core and a homopolar south pole on the left portion of the rotor core.

For operation, the ion separator is filled with a working fluid (salt water, in this case) and, therefore, the rotor shaft is fitted with seals (48 and 49) to prevent leakage along the shaft. Bearings (46 and 47) center the rotor and aid rotation. The core is built with four types of laminations. One type (type 1) is notched in the usual manner of dc-machine rotor laminations in which the cuts in the laminations are along the outer edge of the circular sheet metal. In the second and third types, the cuts do not cross the outer edge of the circular sheet metal but are wholly contained in the sheet metal. Type 3 has a slightly smaller diameter than type 2. Type 2 has the same diameter as type 1. Type 4 laminations do not have any slots on the outer edges. They have much smaller diameters and are used in the middle portion of the rotor core to form a recessed channel. Type 1 laminations are used for the outer portions of the rotor core as shown in FIG. 3. Type 2 and type 3 laminations are used where seals are needed on the rotor. The cuts in the laminations are aligned to form passages in which liquid can flow. Thus, liquid entering slot (68) at one end of the rotor core goes through slot (60) on type 2 and type 3 laminations to enter the channel (69) and can continue through slot (67) to the other end of the rotor core.

There are two seals (54 and 56) that divide the cavity between the rotor and stator into three separate compartments. The left outer compartment includes the cavity between bearing (46) and seal (54). The middle compartment is between seal (54) and seal (56), and the right outer compartment is from seal (56) to bearing (47). The three output ports (22, 24, and 26) are each positioned directly above one of these three compartments. The input port (29) is positioned over one outer compartment. This configuration is the most suitable when the ion separator is used for water pumps.

Each seal (54 or 56) sits in a groove. The groove is created by using one or more type 3 laminations flanged by type 2 laminations on either side. The outer diameters of the type 3 laminations march the internal diameter of the seals.

Referring to FIG. 3, if the magnetic fields are energized and the cavity between the rotor and the stator is filled with salt water, then rotating the shaft clockwise from the left end will cause negative ions in the slots under the poles to be pulled inwards towards channel (69) in the middle of the rotor and the positive ions under the poles to be pushed out of the slots into the two outer compartments between the rotor core and the bearings. Now referring to FIG. 1 and FIG. 2, if we pump salt water through the inlet port (29) when the magnetic fields are energized and the rotor is rotating, the positive ions would be prevented from entering the slots (68) by the outwards-directed electromagnetic forces. These positive ions would be flushed out with the water that gushes out of port (26). The negative ions in the salt water would be pulled into the middle compartment by the electromagnetic forces but would not be able to exit to the next outer compartment because the electromagnetic forces from the other homopolar magnetic field would be working against them to force them back towards the middle of the rotor. The negative ions would exit the device with water that flushes out through port (24). The water that continues to flow through the slot (67) and comes out of port (22) would have none of the ions of the dissolved salts and would, therefore, be desalinated. Two configurations that may be used to achieve water desalination are described next.

Single-Input Desalinating Pump

Figure 5:
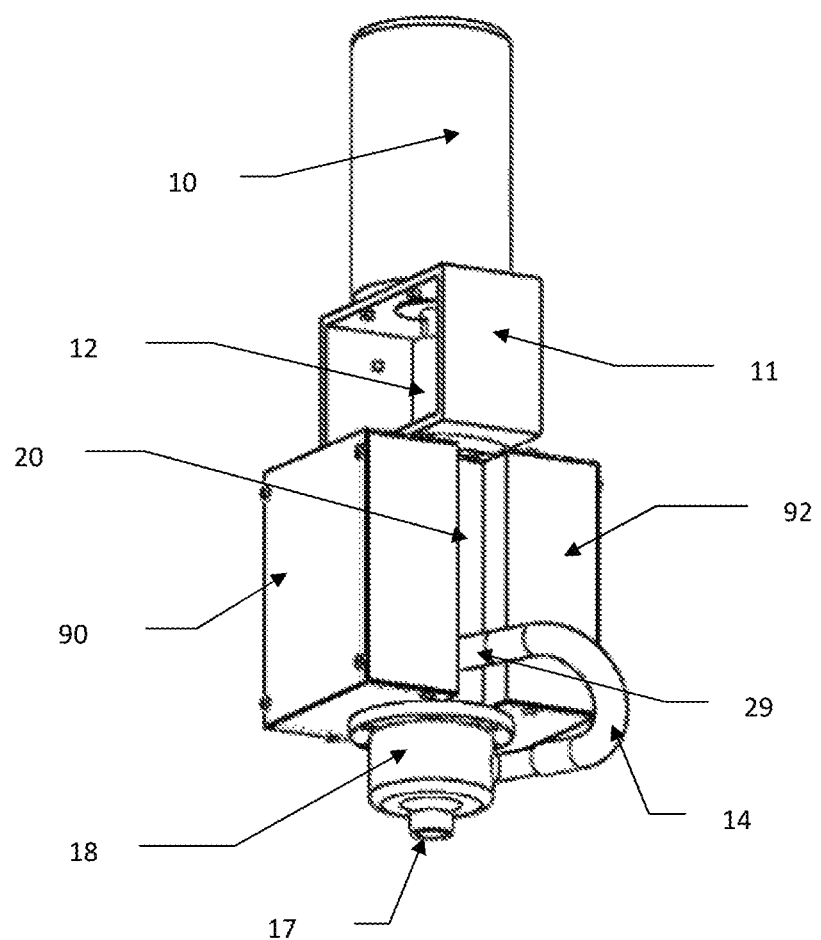
FIG. 5 is a perspective view of an electromagnetic ion separator with an attached mechanical water pump from an input side according to an embodiment of the invention.
Figure 6:
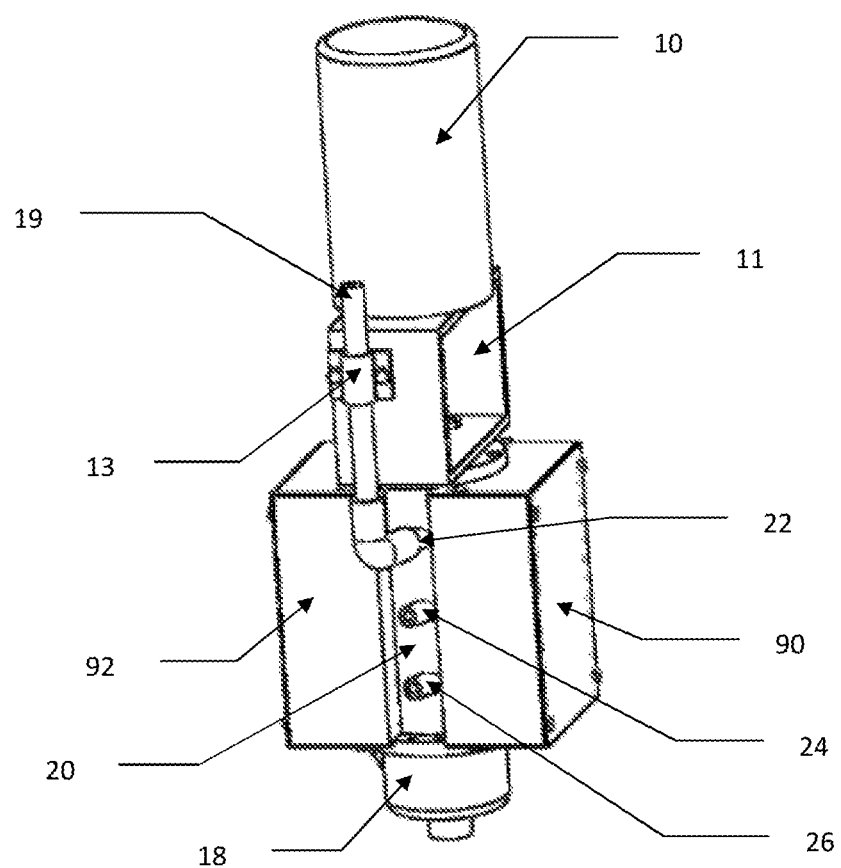
FIG. 6 is a perspective view of an electromagnetic ion separator with an attached mechanical water pump from an output side according to an embodiment of the invention.

FIG. 5 and FIG. 6 illustrate one version of an electromagnetic ion separator for a desalinating water pump. In FIG. 5 and FIG. 6, a drive motor (10) is mounted on a frame 11 that is affixed to the ion separator. A coupler (12) connects the drive motor shaft to the ion separator shaft (42) (not showing in drawing). A mechanical pump (18) is attached to the other end of shaft (42) (not showing in drawing). As the drive motor (10) rotates the shaft of the ion separator, the pump (18) pulls in salt water through inlet (17) and pushes it through tube (14) into the ion separator input port (29). The desalinating process previously described takes place and fresh water exits port (22) into pipe (19) which is secured by clamp (13) to the motor mounting framework (11). (In some cases, a gear box may be required between the ion separator and the mechanical pump (18) to march the output of the mechanical pump to the input capacity of the ion separator.)

Dual-Input Desalinating Pump

Figure 7:
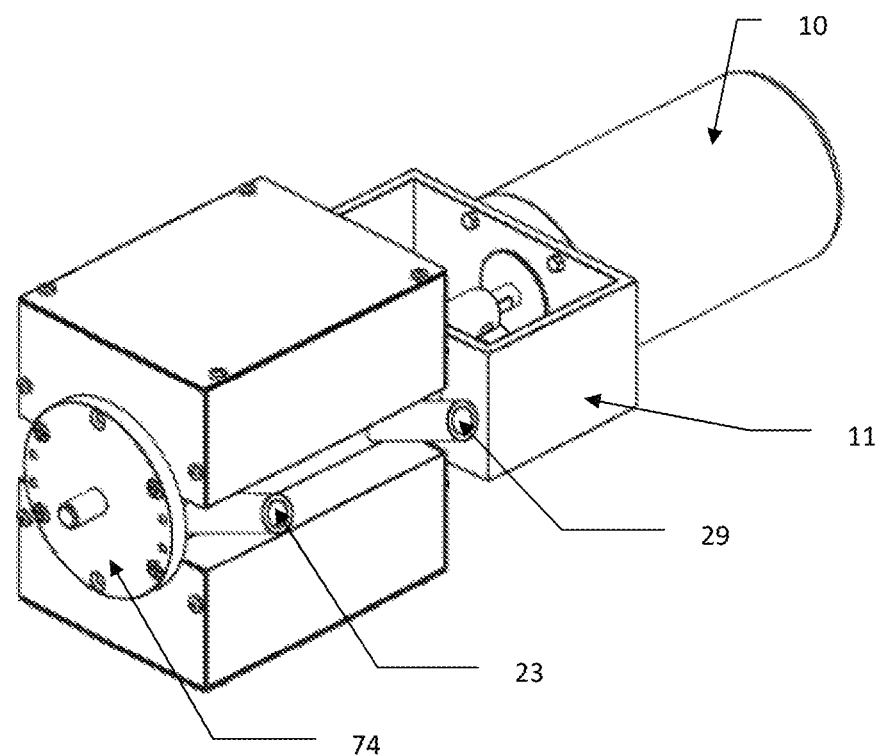
FIG. 7 is a perspective view from an input side of a drive motor and an ion separator with stator reconfigured for dual-input operation according to an embodiment of the invention.
Figure 8:
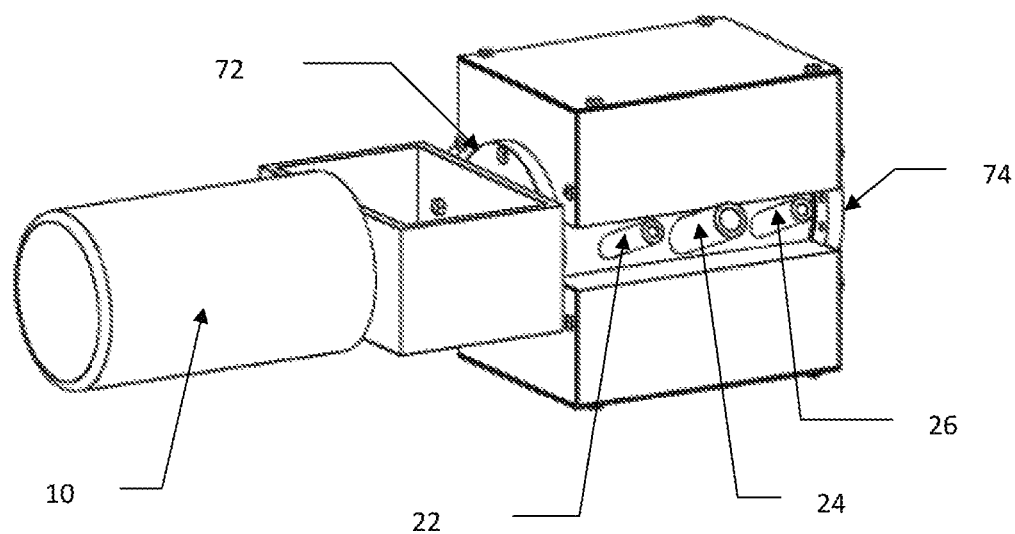
FIG. 8 is a perspective view from an output side of an ion separator with stator reconfigured for dual-input operation according to an embodiment of the invention.
Figure 9:
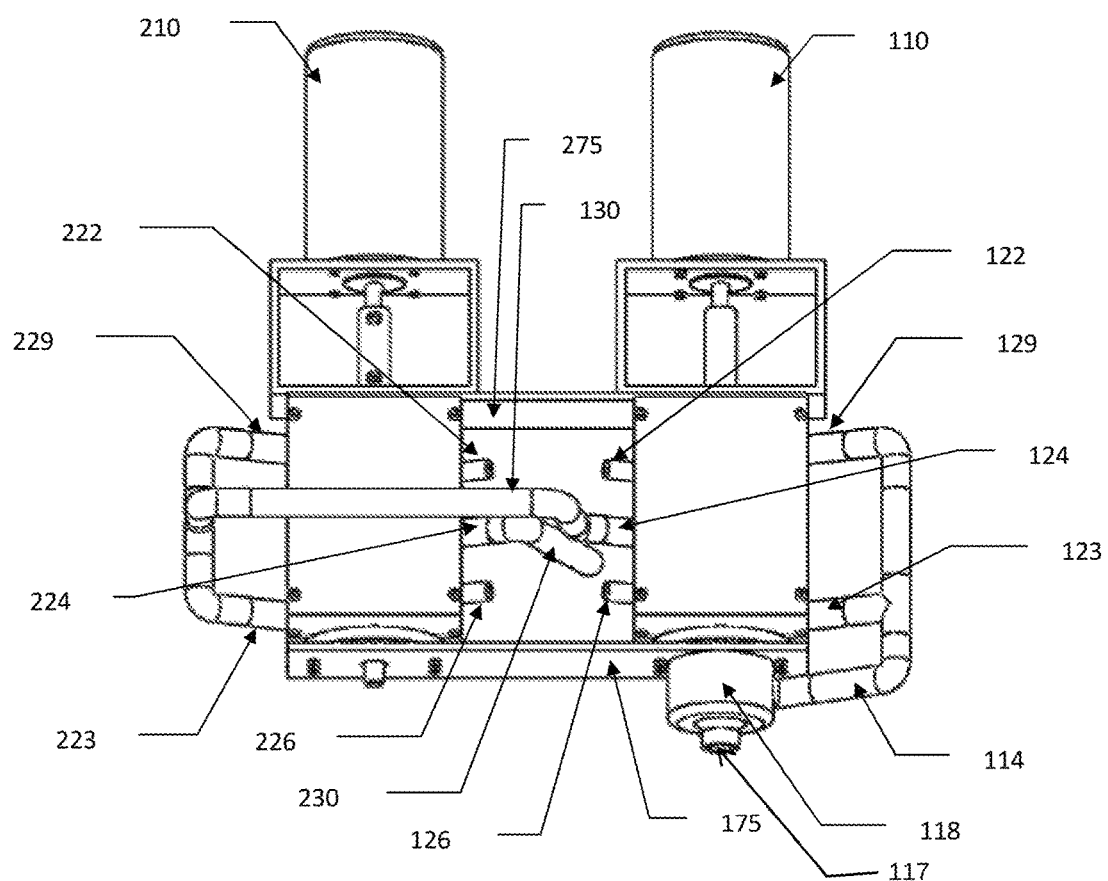
FIG. 9 is a top plant view of the setup for a dual-input operation of ion separator according to an embodiment of the invention.
Figure 10:
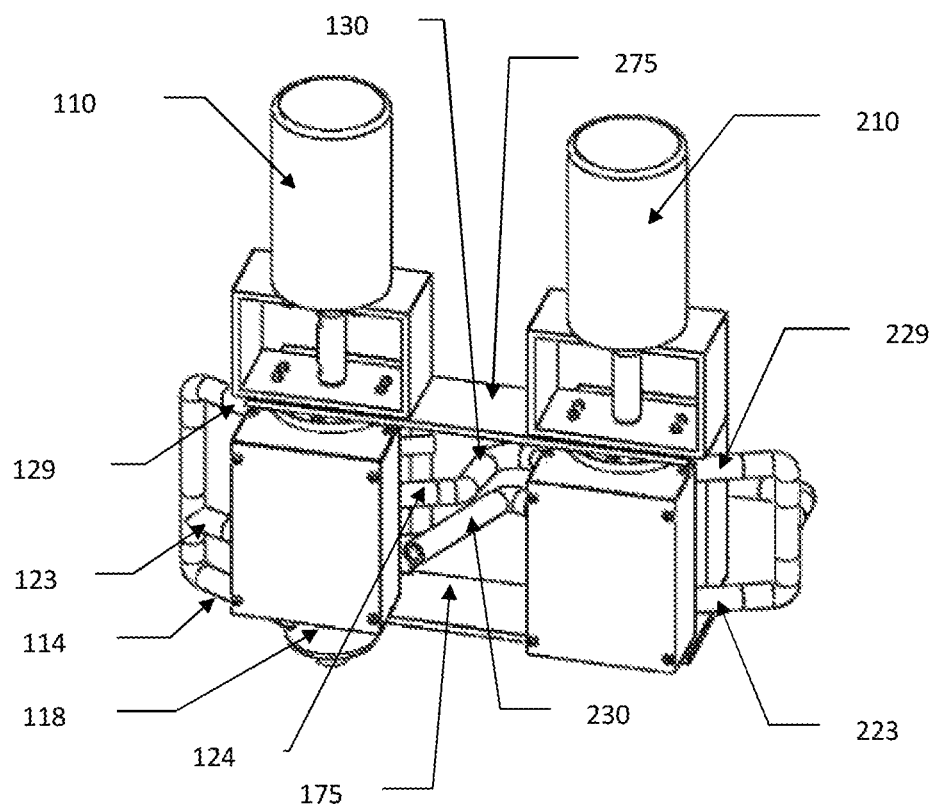
FIG. 10 is a perspective bottom view of the setup for a dual-input operation of ion separators according to an embodiment of the invention.

FIG. 7 through FIG. 10 illustrate a method of operating two ion separators with one mechanical pump to achieve water desalination. For this configuration, the stator of the ion separator is fitted with an additional input port (23) over the second outer compartment as shown in FIG. 7. The output ports (22, 24, and 26) are also appropriately sized as shown in FIG. 8. The configuration and piping for this mode of operation is shown in FIG. 9 and FIG. 10. (Prefixes 1 or 2 are used in FIG. 9 and FIG. 10 to differentiate between the parts and pipe connections to the first and second ion separators). Two plates (175 and 275) are used to brace the two ion separators and their drive motors together. When the motors (110 and 210) are energized they rotate their respective ion separators such that one pulls in negative ions and rejects positive ions while the other ion separator pulls in positive ions and rejects negative ions. As the motors run, the mechanical pump (118) sends salt water through pipe (114) into both inlets (123 and 129) of the first ion separator.

The positive ions in the water are rejected from entering the rotating rotor slots and are flushed out through ports (122 and 126). This makes the effluents from the first ion separator basic. The negative ions are pulled into the rotating rotor slots and exit the first ion separator with the accompanying water via port (124) into pipe (130). Pipe (130) feeds into the two input ports (223 and 229) of the second ion separator through a T-connector delivering water with the negative ions. The second ion separator rejects entry of the negative ions into its rotating rotor slots and these ions are flushed out through exit ports (222 and 226). This makes the effluents from the second ion separator acidic. The water that enters the rotor slots comes out through exit port (224) and pipe (230) and contains no ions of the original dissolved salts and is thus desalinated. The output ports (122 and 126) of the first ion separator are aligned to face the output ports (222 and 226) of the second ion separator. Thus, the acidic effluents of the second ion separator and the basic effluents of the first ion separator empty into the same space and quickly recombine and neutralize each other. (A similar result is obtained if the negative ions are rejected by the first ion separator and the positive ions rejected by the second ion separator.)

Other Stator Designs and Enhancements

Figure 4:
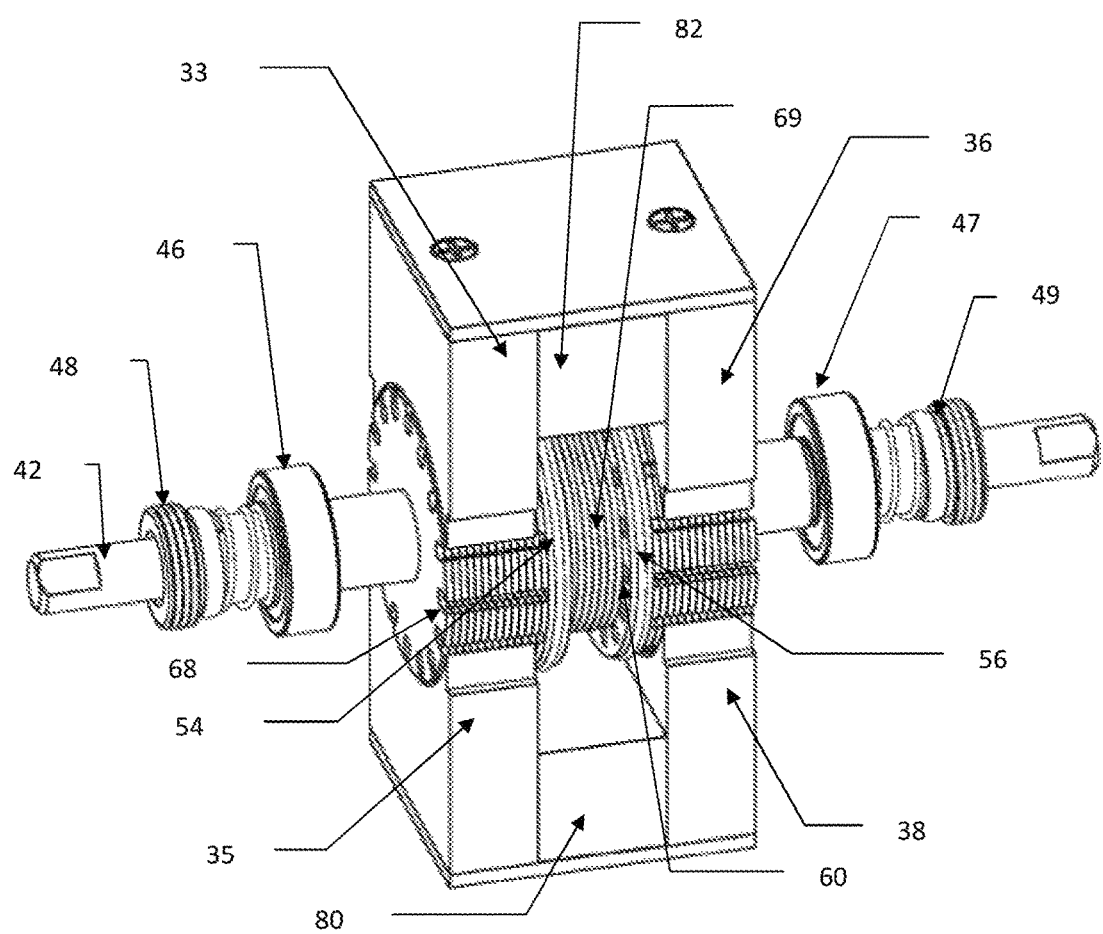
FIG. 4 is a perspective view of an ion separator rotor and magnetic circuits with external permanent magnet excitation according to an embodiment of the invention.

Another way of establishing the magnetic fields in the stator is by using permanent magnets. This is illustrated in FIG. 4 where external permanent magnets (80 and 82) make core 36 and core (38) north poles, and core (33) and core (35) south poles.

Figure 11:
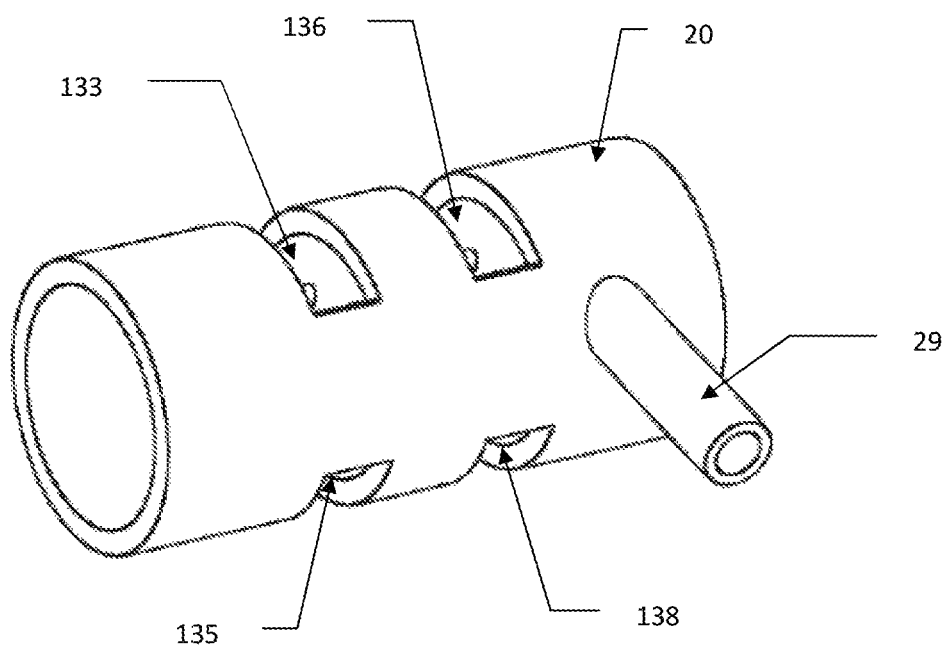
FIG. 11 is a perspective view of a stator with slots for magnetic poles according to an embodiment of the invention.
Figure 12:
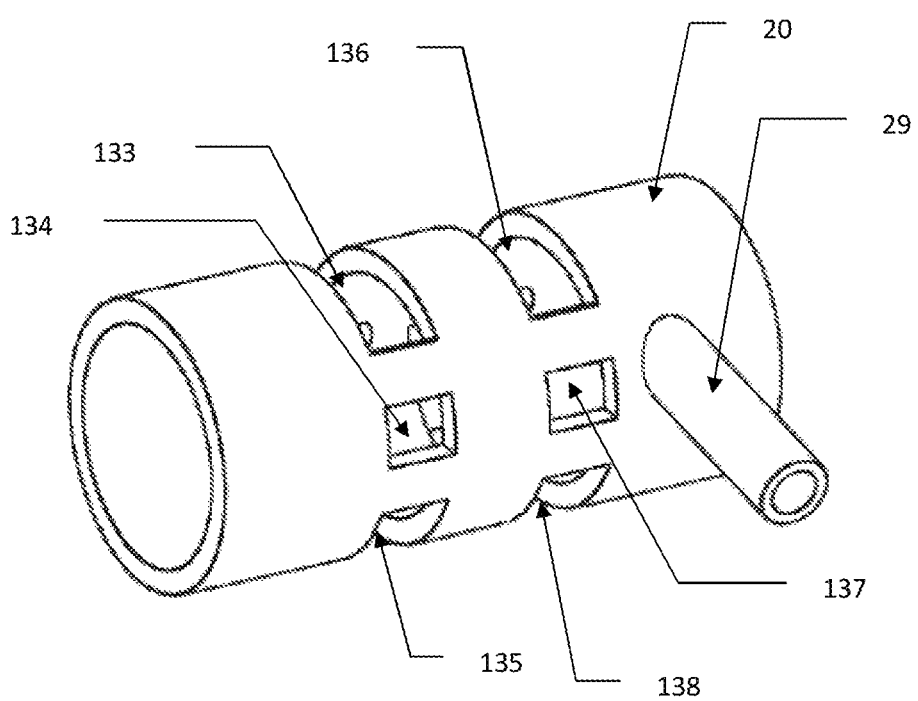
FIG. 12 is a perspective view of a stator with slots for main magnetic poles and interpoles according to an embodiment of the invention.
Figure 13:
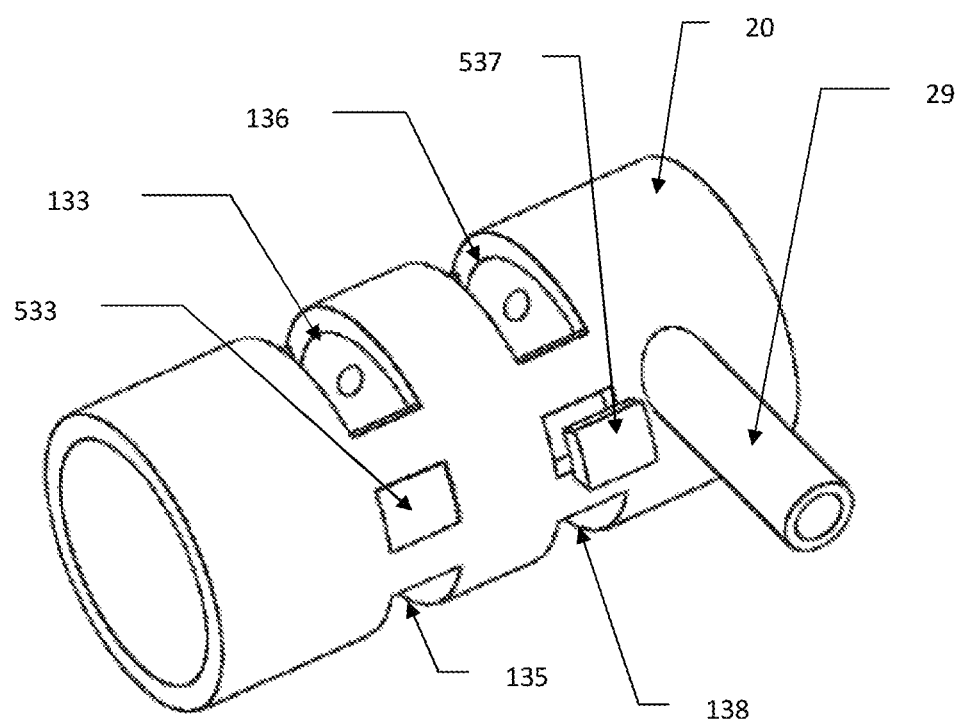
FIG. 13 is a perspective view of a stator with slots for main magnetic poles and permanent magnet interpoles according to an embodiment of the invention.

The stator cylinder (20) in the assembled ion separator in FIG. 1, FIG. 2, FIG. 5, and FIG. 6 is shown in FIG. 11 and it has slots (133, 135, 136, and 138) into which the poles (33, 35, 36, and 38) (shown in FIG. 3) fit such that each pole face is flush with the inner surface of the stator cylinder (20). There are two "dead zones" (opposite each other) along the circumference between slot (133 and 135) where magnetic field would be very weak. A similar situation exists between slot (136 and 138). Interpoles that have south-pole inner faces may be built into these spaces between slots (133 and 135) to increase the south-pole magnetic flux; and interpoles that have north-pole inner faces may be built into these spaces between slots (136 and 138) to increase the north-pole magnetic flux in the stator. This would enhance the electromagnetic activity in the rotor slots as they rotate past these locations. FIG. 12 shows additional slots (134, and 137) made into the stator cylinder (20) to accommodate the interpoles. Radially-magnetized and segmented permanent magnets are suitable for this purpose. FIG. 13 shows such a segmented magnet (533) with south pole on its inner face affixed into slot (134). Another segmented magnet (537) which has a north pole on its inner surface is shown above the slot into which it would be affixed.

Figure 14:
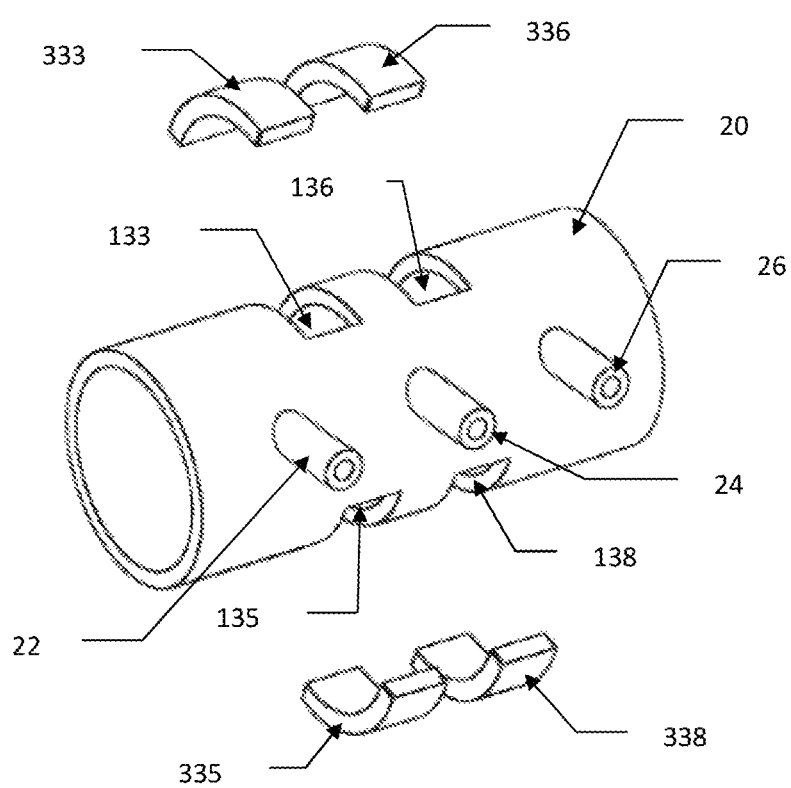
FIG. 14 is an exploded perspective view of a stator with segmented radially-magnetized permanent magnets according to an embodiment of the invention.
Figure 15:
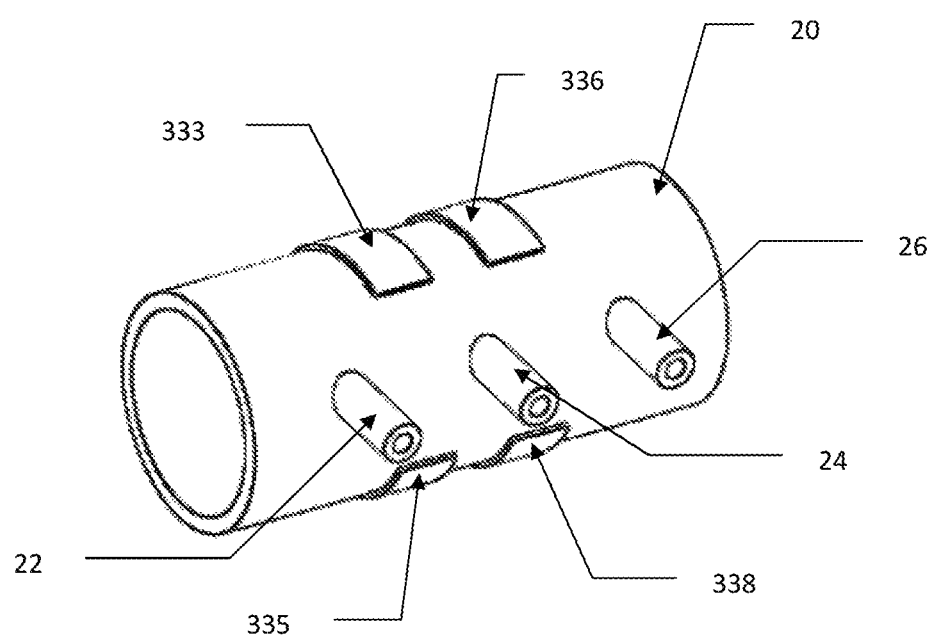
FIG. 15 is a perspective view of a stator with segmented radially-magnetized permanent magnets affixed according to an embodiment of the invention.

FIG. 14 and FIG. 15 illustrate another way of constructing the stator by using only segmented permanent magnets. In FIG. 14, the magnets (333 and 335) have inner south pole faces and they would be affixed into slots (133 and 135) respectively. Similarly, magnets (336 and 338) have north pole inner faces and would be affixed into slots (136 and 138) respectively. FIG. 15 shows the magnets affixed into the stator slots for the ion separator.

Cylindrical permanent magnets can also be used in constructing the stator of the ion separator. The drawings in FIG. 16 and FIG. 17 illustrate this.

Figure 16:
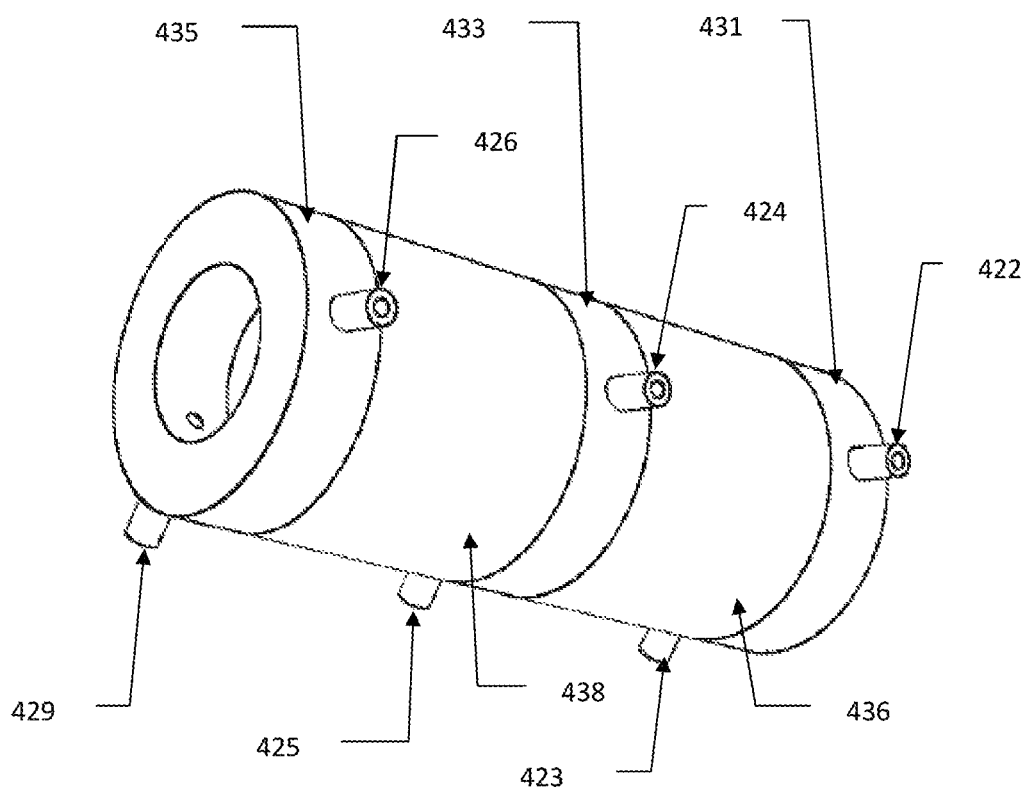
FIG. 16 is a perspective view of a stator made of two cylindrical magnetic structures and three cylindrical non-magnetic spacers stacked together according to an embodiment of the invention.

In FIG. 16 cylindrical magnetic structures (436 and 438) are stacked together with non-magnetic spacers (431, 433, and 435) to make the stator. The magnetic structure (436) could be a cylindrical permanent magnet with south pole inner surface or it could be a regular dc machine stator with one or more field currents reversed to make all the stator poles into south poles. In like manner, magnetic structure (438) could be a cylindrical permanent magnet with north pole on its inner surface, or it could be another dc machine stator reconfigured to have all north poles. The non-magnetic spacers (431, 433, and 435) are also cylindrical with the same internal and external diameters as the magnetic structures (436 and 438). The non-magnetic spacers also have two ports welded into each of them. The input ports are (423, 425, and 429) and the output ports are: (422, 424, and 426). The number of input ports needed depends on the configuration of pump desired. The un-needed ports could just be plugged. Using DC machine stators require filling the original dc machine stator cavity with non-magnetic and inert material such that the inner surface becomes cylindrical and flush with the inner pole faces.

Figure 17:
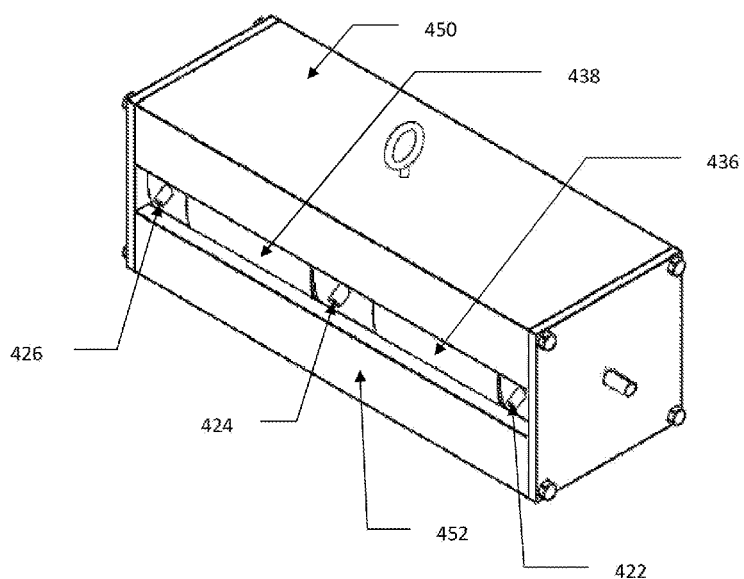
FIG. 17 is a perspective view of an electromagnetic ion separator built with stator made of two cylindrical magnetic structures and three cylindrical non-magnetic spacers stacked together according to an embodiment of the invention.

FIG. 17 shows this stator used in constructing an ion separator. Two external magnetic cores (450 and 452) are bridges between magnetic structures (436 and 438), and they complete the magnetic circuits while also serving as structural braces for the ion separator.

Other Uses for the Water Pump Configurations (1) The ion separator for a water pump could be used to extract the constituent compounds of ionic solutions. While the first stage effluent consists of the original ionic solution and compounds of the rejected ion, the second-stage effluent of both configurations is a compound formed by the solvent and the ions pulled into the middle compartment. Thus, the second stage effluent could either be purely (or, almost purely) the acidic, or basic constituent of the original ionic solution. If needed, further purification can be done by repetition of the extraction above using the second-stage effluent that was obtained in a first round operation for second round extraction.

(2) The ion separator for a water pump could be used for partial extraction of solvent from ionic solutions—just like how it is used for water desalination.

(3) The ion separator for a water pump could be used for increasing the concentration of ionic solutions by the partial extraction of solvent. For this purpose, both effluents would be captured and put together to form the more concentrated form of the original ionic solution.

(4) The ion separator for a water pump could be used for the eventual extraction of solute from ionic solutions. This can be done by increasing the concentration of the solution by partial extraction of solvent and then inducing crystal formation in the concentrated solution.

(5) Arranging magnetic north poles in a circle in and around the same cylinder to create a homopolar north pole field on the shaft and core of the ion separator.

(6) Arranging magnetic south poles in a circle in and around the same cylinder to create a homopolar south pole field on the shaft and core of the ion separator.

(7) Arranging dissimilar magnetic poles (one north, and the other south) adjacent to each other in or around the same cylinder to create two adjacent homopolar fields on a common shaft and core in the ion separator.

(8) Arranging segmented magnets affixed into slots in the stator cylinder for poles and interpoles so that the inner pole faces of the magnets are concentric and flush with the stator cylinder inner surface of the ion separator.

(9) Arranging the pole faces of the electromagnet cores to be concentric and flush with the stator inner surface of the ion separator.

(10) Using interpoles of one polarity in each circle to increase the total stator flux and obtain more electromagnetic separation of ions thereby in the ion separator.
(11) Utilizing cylindrical magnets to establish homopolar magnetic fields in ion separators.
(12) Re-configuring current flows in dc machine stators to make them homopolar structures for use in constructing ion separators.
(13) Placing seals on the rotor (between the rotor and stator) to create various compartments that separate liquids of different compositions that result from the electromagnetic ion separation.
(14) Using different types of stamped core laminations to create slots and grooves on the rotor for mounting seals.
(15) Creating a recessed middle channel on the rotor to reduce leakage magnetic flux.
(16) Providing ports in the stator of the ion separator which allow access to the various compartments for the introduction or removal of liquids.
(17) Utilizing salt water in an electrical machine armature as the working medium.
(18) Pipe-based design of ion separator stator in which all the magnetic circuit excitation is located outside the stator cylinder with only the ends of the poles entering the stator cylinder.
(19) Pumping salt water through the ion separator from one end through the device to the other end so that positive and negative ions can be blocked alternatively from going through various sections of the ion separator with the flow.
(20) Providing outlet ports for the ions prevented from going into the rotor slots at various points to exit the ion separator near those points.
(21) Utilizing the pump pressure to flush out the ions prevented from going into the rotor slots with the flow.
(22) Configuring two ion separators in parallel to achieve water desalination.
(23) Configuring parallel flow of water in the ion separator so that the removal of the positive ions is confined to only one ion separator unit and the removal of the negative ions is confined to another ion separator unit.
(24) Positioning the two ion separators units such that their effluents discharge into each other thus promoting quick recombination and neutralization.
(25) Attaching the mechanical pump to the ion separator to make it one compact unit.

An aspect of the invention provides an ion separator for a water pump comprising a stator cylinder, a drive shaft, a rotor core, a pair of homopolar north poles, and a pair of homopolar south poles.

The drive shaft is disposed in the stator cylinder, extending from a right end portion of the stator cylinder to a left end portion of the stator cylinder, and configured to rotate with respect to the stator cylinder.

The rotor core is disposed around the drive shaft and comprises right (rotor core) laminations disposed on a right side portion of the rotor core, left (rotor core) laminations disposed on a left side portion of the rotor core, middle (rotor core) laminations disposed between the right and left rotor core laminations, right comparting (rotor core) laminations disposed between the right rotor core laminations and the middle rotor core laminations, and left comparting (rotor core) laminations disposed between the left rotor core laminations and the middle rotor core laminations, so that a cavity between the rotor core and stator cylinder is divided into a right outer compartment, a left outer compartment, and a middle compartment through two comparting seals (54, 56) installed between the stator cylinder and the right and left comparting rotor core laminations.

The pair of homopolar north poles are disposed close to a right end portion of the rotor core with a pair of air gaps over right rotor core laminations installed around the rotor core, and the pair of homopolar north poles are disposed so as to face each other on the upper side and the lower side of the rotor core through the stator cylinder.

The pair of homopolar south poles are disposed close to a left end portion of the rotor core with a pair of air gaps over left rotor core laminations installed around the rotor core, and the pair of homopolar south poles are disposed so as to face each other on the upper side and the lower side of the rotor core through the stator cylinder.

The ion separator for a water pump may further comprise a pair of rotor shaft seals (48, 49) installed between the drive shaft and right and left end surface portions of the stator cylinder for preventing leakage along the drive shaft.

Each of the right and left (rotor core) laminations may comprise a circular sheet metal with cut-out portions provided along outer edges of the circular sheet metal, and the circular sheet metal may have a diameter that is slightly smaller than an inner diameter of the stator cylinder.

The middle (rotor core) laminations may have a diameter smaller than the diameter of the right and left (rotor core) laminations, so as to form a recessed channel between the stator cylinder and the middle rotor core laminations.

Each of the right and left comparting (rotor core) laminations may comprise one or more first circular sheet metals having a diameter same as the diameter of the right and left (rotor core) laminations and one or more second circular sheet metals having a diameter slightly smaller than the diameter of the right and left (rotor core) laminations, and the circular sheet metals of the right and left comparting (rotor core) laminations may comprise a plurality of through-slots and the circular sheet metals are assembled so that the through-slots are aligned with one another.

The pair of homopolar north poles and the pair of homopolar south poles may comprise a pair of magnetic circuits, each of which comprising core members and field winding.

The pair of homopolar north poles and the pair of homopolar south poles may comprise a plurality of permanent magnets.

The ion separator for a water pump may further comprise an input port (29) disposed and connected to either the left or the right outer compartment.

The ion separator for a water pump may further comprise three output ports (22, 24, 26), which are disposed and connected to the right and left outer compartments and the middle compartment.

The ion separator for a water pump may further comprise a drive motor (10) and a mechanical pump (18).

The drive motor (10) is installed to a first end portion of the drive shaft and configured for rotating the drive shaft.

The mechanical pump (18) is installed to a second end portion of the drive shaft and configured for pulling in salt water through a salt water through inlet (17) provided through the mechanical pump (18) from outside and pushing it out into the input port (29) through a through tube (14).

The ion separator for a water pump may further comprise a frame (11) for connecting the drive motor (10) to the stator cylinder (20) through a coupler (12) provided through the frame (11).

Another aspect of the invention provides a water desalination system comprising a first ion separator and a second ion separator, a first drive motor (110), a second drive motor (210), a mechanical pump, and connecting pipes as shown in FIGS. 9-10.

The first ion separator or the second ion separator is slightly different from the one in the previous embodiment. These have two input ports located over their outer compartments and the previous embodiment had only one input port.

The first drive motor (110) is installed to a first end portion of the drive shaft of the first ion separator and configured for rotating the drive shaft.

The second drive motor (210) is installed to a first end portion of the drive shaft of the second ion separator and configured for rotating the drive shaft.

The mechanical pump (118) is installed to a second end portion of the drive shaft of the first ion separator and configured for pulling in salt water through a salt water through inlet (117) provided through the mechanical pump (118) from outside and pushing out into the input ports (123, 129) through a through tube (114).

A feeding pipe (130) is connected and configured for feeding water containing negative ions (or positive ions, depending on the sense of rotation of the preceding ion separator) from a port (124) of the first ion separator into two input ports (223, 229) of the second ion separator through a T-connector.

The motors (110, 210) are energized so as to rotate a corresponding ion separator such that one of them pulls in the negative ions and rejects positive ions while the other ion separator pulls in positive ions and rejects the negative ions.

The positive ions in the water are rejected from entering the rotating rotor slots of the first ion separator and are flushed out through ports (122 and 126). This makes the effluents from the first ion separator basic.

The second ion separator rejects entry of the negative ions into its rotating rotor slots and these ions are flushed out through exit ports (222, 226), this makes the effluents from the second ion separator acidic, and the water that enters the rotor slots comes out through exit port (224) and pipe (230) and contains no ions of the original dissolved salts and is thus desalinated.

The output ports (122, 126) of the first ion separator are aligned to face the output ports (222, 226) of the second ion separator, such that the acidic effluents of the second ion separator and the basic effluents of the first ion separator empty into the same space and quickly recombine and neutralize each other.

The water desalination system may further comprise a first drive motor (110), a first frame, a second drive motor (210), and a second frame.

The first drive motor (110) is installed to a first end portion of the drive shaft of the first ion separator and configured for rotating the drive shaft.

The first frame is for connecting the drive motor (110) to the stator cylinder (20) through a first coupler provided through the first frame.

The second drive motor (210) is installed to a first end portion of the drive shaft of the second ion separator and configured for rotating the drive shaft.

The second frame is for connecting the drive motor (210) to the stator cylinder (20) through a second coupler provided through the second frame.

As shown in FIGS. 11-16, the stator cylinder may comprise a plurality of magnet poles (33, 35, 36, 38) inserted into a plurality of slots (133, 135, 136, 138) fitting each pole face flush with the inner surface of the stator cylinder.

The stator cylinder may further comprise a pair of first interpoles (533) and a pair of second interpoles (537).

The pair of first interpoles (533) having south-pole inner faces are disposed in a pair of first dead zones (134) between the first slots (133, 135) (that carry south poles).

The pair of second interpoles (537) having north-pole inner faces are disposed in a pair of second dead zones (137) between the second slots (136, 138) (that carry north poles).

The stator cylinder may further comprise a pair of first segmented magnets (333, 335) and a pair of second segmented magnets (336, 338) (that carry north poles).

The pair of first segmented magnets (333, 335) have inner south pole faces and are affixed into a pair of first slots (133, 135).

The pair of second segmented magnets (336, 338) have inner north pole faces and are affixed into a pair of second slots (136,138).

The stator cylinder may comprise three non-magnetic spacers (431, 433, 435) and two cylindrical magnetic structures (436, 438) disposed among the three non-magnetic spacers.

As shown in FIG. 17, the ion separator for a water pump may further comprise two external magnetic cores (450, 452) configured to act as bridges between the two cylindrical magnetic structures (436, 438), and to complete magnetic circuits, and also serve as structural braces for the ion separators.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An ion separator comprising:
a stator cylinder;
a drive shaft disposed in the stator cylinder, extending from a right end portion of the stator cylinder to a left end portion of the stator cylinder, and configured to rotate with respect to the stator cylinder;
a rotor core disposed around the drive shaft and comprising a right rotor core laminations disposed on a right side portion of the rotor core, a left rotor core laminations disposed on a left side portion of the rotor core, a middle rotor core laminations disposed between the right and the left rotor core laminations, a right comparting rotor core laminations disposed between the right rotor core laminations and the middle rotor core laminations, and a left comparting rotor core laminations disposed between the left rotor core laminations and the middle rotor core laminations, so that a cavity between the rotor core and stator cylinder is divided into a right outer compartment, a left outer compartment, and a middle compartment through two comparting seals installed between the stator cylinder and the right and left comparting rotor core laminations;
a pair of homopolar north poles disposed close to a right end portion of the rotor core with a pair of air gaps over the right rotor core laminations, wherein the pair of homopolar north poles are disposed so as to face each other on an upper and a lower sides of the rotor core through the stator cylinder; and
a pair of homopolar south poles disposed close to a left end portion of the rotor core with a pair of air gaps over the left rotor core laminations, wherein the pair of homopolar south poles are disposed so as to face each other on the upper and lower sides of the rotor core through the stator cylinder; wherein the stator cylinder further comprises one or more input ports into which an electrolyte carrying fluid enters and a plurality of output ports from which the electrolyte carrying fluid exits so that the rotation of the drive shaft forces ions to be separated.

2. The ion separator of claim 1, further comprising a pair of rotor shaft seals installed between the drive shaft and right and left end surface portions of the stator cylinder for preventing leakage along the drive shaft.

3. The ion separator of claim 2, wherein each of the right and left rotor core laminations comprises a circular sheet metal with cut-out portions provided along outer edges of the circular sheet metal, and wherein the circular sheet metal has a diameter that is slightly smaller than an inner diameter of the stator cylinder, and wherein the middle rotor core laminations have a diameter smaller than the diameter of the right and left rotor core laminations, so as to form a recessed channel between the stator cylinder and the middle rotor core laminations.

4. The ion separator of claim 3, wherein each of the right and left comparting rotor core laminations comprise one or more first circular sheet metals having a diameter same as the diameter of the right and left rotor core laminations and one or more second circular sheet metals having a diameter slightly smaller than the diameter of the right and left rotor core laminations, and wherein each the circular sheet metals of the right and left comparting rotor core laminations comprises a plurality of through-slots and the circular sheet metals are assembled so that the through-slots are aligned with one another.

5. The ion separating device of claim 1, wherein the pair of homopolar north poles and the pair of homopolar south poles comprise a pair of magnetic circuits.

6. The ion separator of claim 1, wherein the pair of homopolar north poles and the pair of homopolar south poles comprise a plurality of permanent magnets.

7. The ion separator of claim 1 wherein one or more of the input ports is attached to the stator cylinder and connected to either the right or the left outer compartment.

8. The ion separator of claim 7 wherein the plurality of output ports are disposed and connected to the right and left outer compartments and the middle compartment.

9. The ion separator of claim 7, further comprising:
a drive motor installed to a first end portion of the drive shaft and configured for rotating the drive shaft;
a mechanical pump installed to a second end portion of the drive shaft and configured for pulling in salt water through a salt water through inlet provided through the mechanical pump from outside and pushing out into one of the one or more input ports through a through tube.

10. The ion separator of claim 9, further comprising a frame for connecting the drive motor to the stator cylinder through a coupler provided through the frame.

11. A dual-input water desalination system comprising:
a first ion separator of claim 9 with an additional input port;
a second ion separator of claim 9 with an additional input port;
a first drive motor attached to the first ion separator and installed to a first end portion of the drive shaft of the first ion separator and configured for rotating the drive shaft;
a second drive motor attached to the second ion separator and installed to a first end portion of the drive shaft of the second ion separator and configured for rotating the drive shaft;
a mechanical pump installed to a second end portion of the drive shaft of the first ion separator and configured for pulling in water through a water through inlet provided through the mechanical pump from outside and pushing it out into the input ports, through a through tube; and a feeding pipe connected and configured for feeding water containing negative ions from a port of the first ion separator into two input ports of the second ion separator through a T-connector,
wherein the motors are energized so as to rotate a corresponding ion separator such that the first ion separator pulls in the negative ions and rejects positive ions while the second ion separator pulls in positive ions and rejects the negative ions forming acidic effluents and basic effluents,
wherein the positive ions in the water are rejected from entering a plurality of first ion separator rotating rotor slots and are flushed out through exit ports,
wherein a second ion separator rejects entry of the negative ions into a plurality of second ion separator rotating rotor slots and these ions are flushed out through exit ports, and the water that enters the second ion separator rotating rotor slots comes out through one of the plurality of output ports and pipe and contains no ions of the original dissolved salts and is thus desalinated.

12. The water desalination system of claim 11, wherein the output ports of the first ion separator are aligned to face the output ports of the second ion separator, such that the acidic effluents of the second ion separator and the basic effluents of the first ion separator empty and quickly recombine and neutralize the acidity and alkalinity of both acidic and basic effluents.

13. The water desalination system of claim 12, further comprising:
a first frame for connecting the first drive motor to the stator cylinder of the first ion separator through a first coupler provided through the first frame; and
a second frame for connecting the second drive motor to the stator cylinder of the second ion separator through a second coupler provided through the second frame.

14. The ion separator of claim 7, wherein the stator cylinder comprises a plurality of magnet poles inserted into a plurality of slots fitting each magnet pole such that each pole face is flush with the inner surface of the stator cylinder.

15. The ion separator of claim 14, wherein the stator cylinder further comprises:
a pair of first interpoles having south-pole inner faces disposed in a pair of first dead zones between a plurality of first slots of the stator cylinder; and
a pair of second interpoles having north-pole inner faces disposed in a pair of second dead zones between a plurality of second slots of the stator cylinder.

16. The ion separator of claim 14, wherein the stator cylinder further comprises:
a pair of first segmented magnets having inner south pole faces and affixed into a pair of first slots; and
a pair of second segmented magnets having inner north pole faces and affixed into a pair of second slots.

17. The ion separator of claim 7, wherein the stator cylinder comprises three non-magnetic spacers and two cylindrical magnetic structures disposed among the three non-magnetic spacers.

18. The ion separator of claim 17, further comprising two external magnetic cores attached to the ion separators.

19. The ion separator of claim 18, wherein the ion separator is used for extracting constituent compounds of ionic solutions from second-stage effluents, or for increasing the concentration of ionic solutions by the partial extraction of solvent.

* * * * *